United States Patent [19]

Kambara et al.

[11] Patent Number: 4,576,113
[45] Date of Patent: Mar. 18, 1986

[54] APPARATUS FOR COATING VISCOUS MATERIAL ON A SEAL EDGE SURFACE OF A CATHODE RAY TUBE

[75] Inventors: Goro Kambara, Valley Center; Makoto Fujii, Escondido, both of Calif.

[73] Assignee: Sony Corporation, Tokyo, Japan

[21] Appl. No.: 630,229

[22] Filed: Jul. 12, 1984

[51] Int. Cl.⁴ .............................................. B05C 5/02
[52] U.S. Cl. .................................. 118/697; 118/704; 118/315; 118/323; 118/411
[58] Field of Search ............... 118/411, 410, 696, 697, 118/704, 315, 323; 222/207

[56] References Cited

U.S. PATENT DOCUMENTS

| | | | |
|---|---|---|---|
| 3,794,222 | 2/1974 | Loewenthal | 222/207 |
| 4,030,640 | 6/1977 | Citrin et al. | 222/207 |
| 4,262,036 | 4/1981 | Mineyama et al. | 427/64 |
| 4,482,579 | 11/1984 | Fujii et al. | 427/64 |

*Primary Examiner*—John P. McIntosh
*Attorney, Agent, or Firm*—Lewis H. Eslinger; Alvin Sinderbrand

[57] ABSTRACT

In an apparatus for applying a viscous material, for example, a frit slurry, to a horizontally disposed seal edge surface of the funnel portion of a cathode ray tube through nozzles moved in a closed pattern above such surface, the frit slurry is supplied under pressure from a valved outlet of a container or other source through flexible hoses and then bellows to the nozzles, and the bellows are contracted and expanded in correspondence with the opening and closing, respectively, of the valved outlet.

14 Claims, 12 Drawing Figures

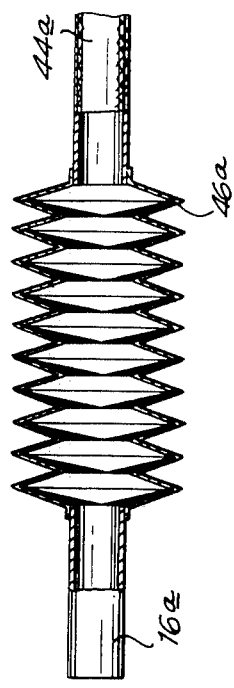
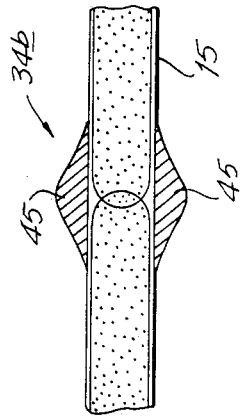
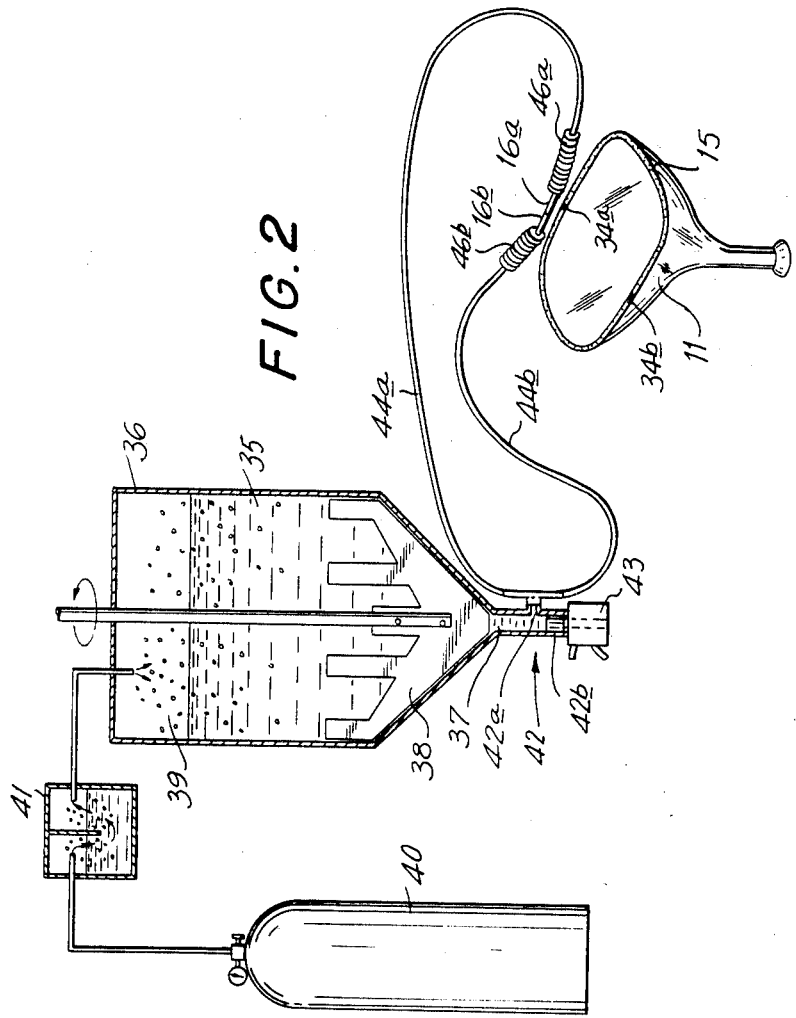
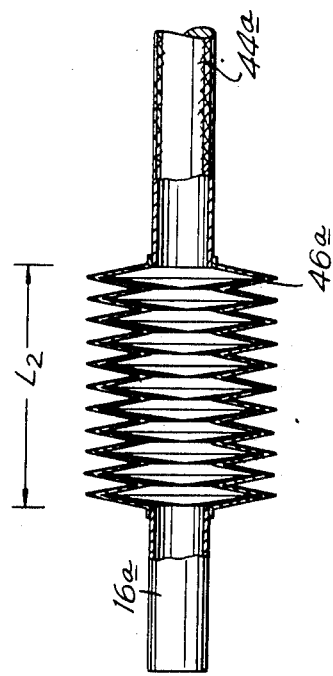

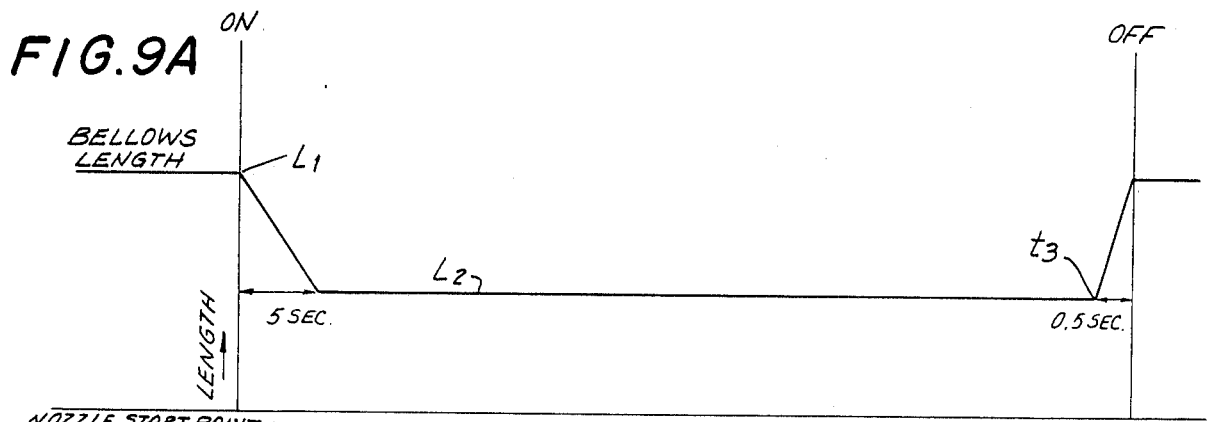
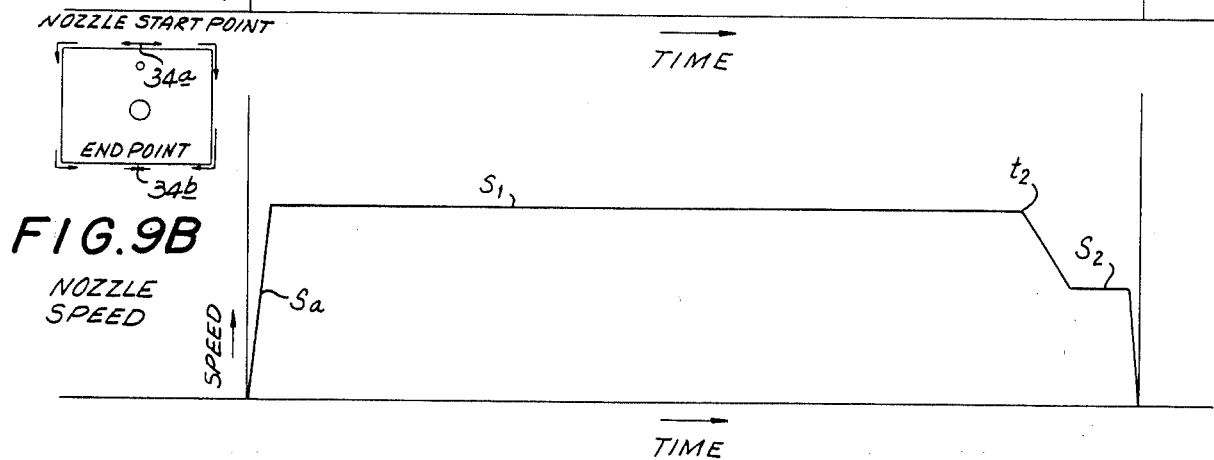
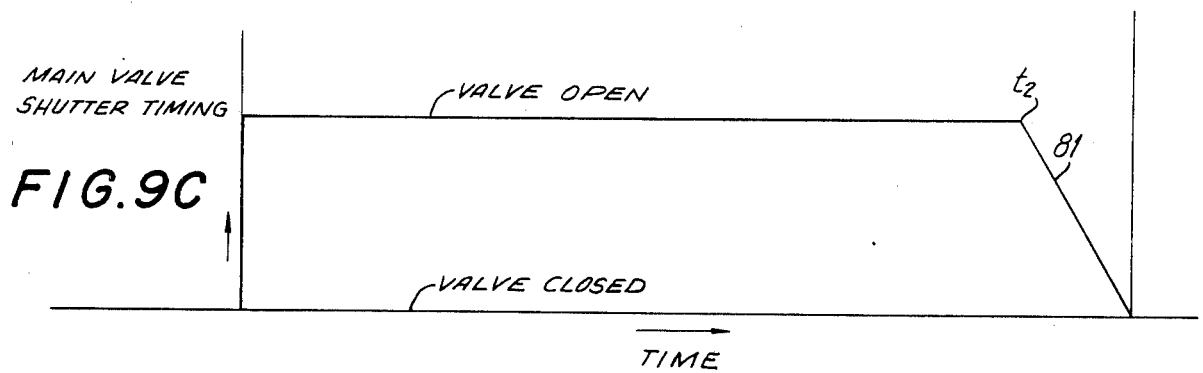
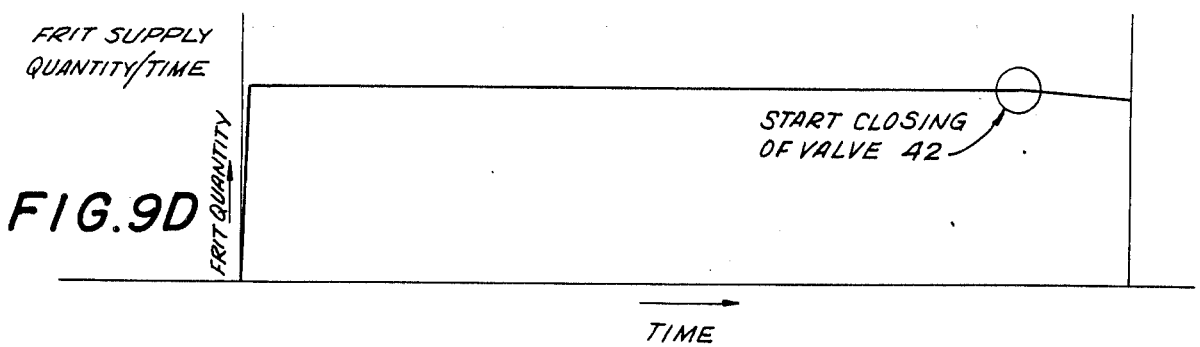

APPARATUS FOR COATING VISCOUS MATERIAL ON A SEAL EDGE SURFACE OF A CATHODE RAY TUBE

BACKGROUND OF THE INVENTION

1. Field of the Invention

This invention relates to apparatus for coating a stripe of viscous material on a sealing surface, and more particularly is directed to improvements in the application of frit slurry in a closed pattern on the sealing surface of the funnel-shaped portion of a cathode ray tube.

2. Description of the Prior Art

Glass-to-glass seals particularly useful in assembling parts of various types of display tubes, such as, for example, in assembling a glass face plate of a cathode ray tube to a funnel-shaped rear portion, are made by laying down a stripe of frit slurry containing low temperature melting glass particles in a binder in a closed pattern on a sealing surface on one of the two members to be sealed or assembled with each other, placing the other member to be sealed against the coated sealing surface, and heating the assembly to a temperature which causes the frit slurry to fuse and thereby unite the two members to be sealed or joined.

In accordance with the prior art, for example, as disclosed in U.S. Pat. No. 4,262,036, issued Apr. 14 1981, and having a common assignee herewith, the funnelshaped portion of a cathode ray tube is supported with its sealing surface facing upwardly in a horizontal plane, and first and second nozzles having parallel horizontal axes are disposed above the horizontal sealing surface and are moved in opposite directions along a path corresponding to the desired closed pattern on the sealing surface from a first position at which outlets of the first and second nozzles are abuttingly opposed and in mutually blocking relation to a second position at which the first and second nozzle outlets are again mutually opposed. A flow of the frit slurry is supplied under pressure, for example, from a pump or pressurized container, at a constant rate through flexible hoses to the first and second nozzles during the motion of the latter between the first and second positions. The flow of the frit slurry through the flexible hoses to the nozzles is controlled either through the operation of the pump or by a valve provided at an outlet from the pressurized container for the frit slurry. However, such control of the flow of the frit slurry into the flexible hoses leading to the nozzles does not provide adequate control of the flow of frit slurry from the nozzle outlets. More particularly, by reason of the inherent elasticity of the flexible hoses, the commencement of the issuance of frit slurry from the nozzle outlets is somewhat delayed following the opening of the valve at the outlet of the pressurized container or the commencement of operation of the pump, whereas frit slurry continues to flow from the nozzles following the closing of the valve at the pressurized container outlet or the cessation of operation of the pump. Thus, the amounts of the frit slurry deposited from the nozzles adjacent their first and second, or starting and terminating positions, are not precisely controllable and, in any case, are not uniform relative to the amounts of frit slurry deposited along other portions of the closed pattern. In view of the foregoing, it has been proposed in the previously identified U.S. patent to provide a shutter for blocking the outlet of at least one of the first and second nozzles as the nozzles are moved to the second or terminating position notwithstanding the fact that the elasticity of the flexible hose continues to exert a pressure on the frit slurry in back of the closed shutter.

However, in the above described apparatus according to the prior art, when the shutter is opened at the commencement of a coating operation, the pressure on the frit slurry due to the elasticity of the flexible hoses connected to the nozzles interferes with the smooth opening of the shutter and further causes the frit slurry to spurt suddenly from the nozzle outlet or outlets with the result that the frit slurry is initially scattered beyond the sealing edge surface and drops inside and outside the funnel-shaped portion of the cathode ray tube. Further, difficulty is experienced in timing the opening and closing of the shutter in relation to the opening and closing, respectively, of the valve at the outlet of the pressurized frit slurry container, with the result that it is difficult to precisely control the amount of frit slurry applied at the first and second or initial and terminating positions of the nozzles in respect to the closed pattern along which the frit slurry is applied to the sealing surface. By reason of the foregoing difficulties, the thicknesses of the frit slurry at the first and second positions along the closed pattern are not uniform with the amounts deposited at other portions along the closed pattern, and a skilled worker is still required for manually doctoring the applied frit slurry.

Furthermore, since the frit slurry dries readily when it comes in contact with a air, the shutter provided at the nozzle outlet or outlets is susceptible to clogging by the dried frit slurry and much time and expense is required for maintenance of the shutter. The susceptibility to clogging of the shutter further prevents the reliable automatic operation of the apparatus without the need for human supervision.

OBJECTS AND SUMMARY OF THE INVENTION

Accordingly, it is an object of this invention to provide an apparatus for applying frit slurry or other viscous material to a surface of an article, and which avoids the above-mentioned problems and disadvantages of the prior art.

More particularly, it is an object of this invention to provide an apparatus for applying frit slurry or other viscous material in a closed pattern on a horizontally disposed surface and in which the amount of the applied material is uniform along the entire closed pattern, and particularly at the positions where the application of the viscous material is commenced and terminated.

Another object of the invention is to provide an apparatus, as aforesaid, which can be operated automatically and without human intervention or supervision.

In accordance with an aspect of this invention, in an apparatus for applying a viscous material, such as, frit slurry, to a horizontally disposed surface, such as, the seal edge surface of the funnel portion of a cathode ray tube, through one or more nozzles moved in a closed pattern above such surface, and in which the frit slurry is supplied under pressure to each nozzle from a valved outlet of a container or other source thereof through a respective flexible hose; a bellows is interposed between each flexible hose and the respective nozzle, and each bellows is contracted and expanded in correspondence with the opening and closing, respectively, of the valved outlet of the source of frit slurry under pressure.

In a preferred embodiment of the invention, the rate of contraction of each bellows is slow relative to the rate of expansion of the bellows.

The above, and other objects, features and advantages of the invention, will be apparent in the following detailed description of an illustrative embodiment of the invention which is to be read in connection with the accompanying drawings, wherein the same reference numerals are used to identify corresponding parts in the several views.

BRIEF DESCRIPTION OF THE DRAWINGS

FIG. 2 is a schematic view illustrating a system for supplying frit slurry to nozzles of the apparatus shown on FIG. 1;

FIG. 5 is a detailed view of one of the nozzles and its associated bellows shown in the expanded condition of the latter;

FIG. 6 is a view similar to that of FIG. 5, but showing the bellows in its contracted condition;

FIG. 7 is a diagrammatic view illustrating the manner in which the apparatus according to this invention ensures the uniform application of frit slurry to the seal surface at the termination of the movement of the nozzles along the closed path or pattern;

FIGS. 9A–9D are timing charts to which reference will be made in explaining the operation of the apparatus embodying the invention.

DETAILED DESCRIPTION OF A PREFERRED EMBODIMENT

Figure 1:
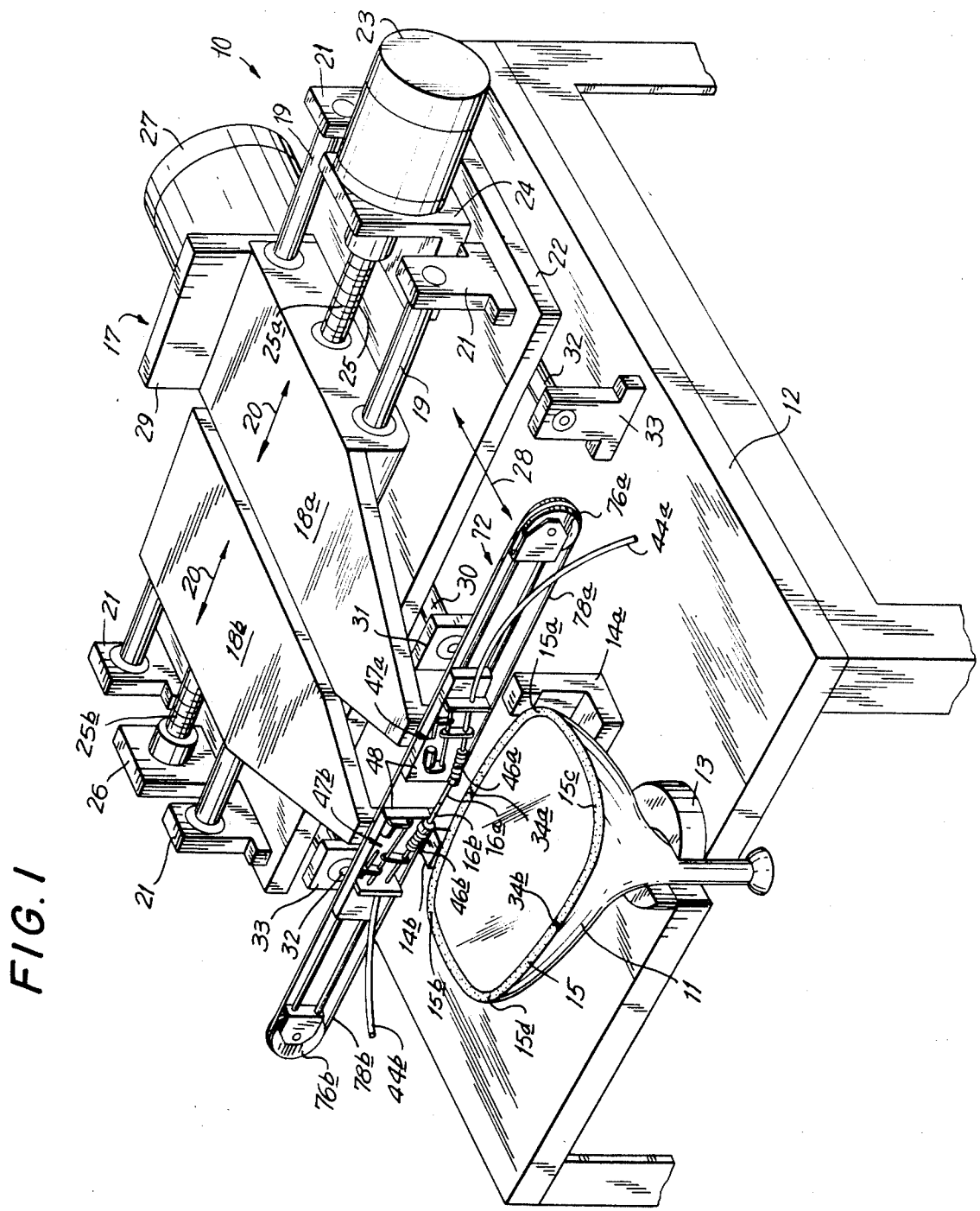
FIG. 1 is a perspective view of an apparatus according to an embodiment of this invention.

Referring to the drawings in detail, and initially to FIG. 1 thereof, it will be seen that the present invention may be desirably applied to an apparatus 10 for applying frit slurry to a sealing surface of a funnel-shaped rear member 11 of a cathode ray tube, and which is similar to the apparatus disclosed in U.S. Pat. No. 4,137,341, issued Jan. 30, 1979, and having a common assignee herewith. Apparatus 10 is shown to comprise a bench or frame 12 carrying a supporter 13 for holding the funnel-shaped rear member 11 in an upright position and cooperating with holding brackets 14a and 14b also fixed on bench 12 for ensuring that sealing surface 15 of funnel-shaped portion 11 faces upwardly in a horizontal plane.

First and second nozzles 16a and 16b are arranged horizontally above sealing surface 15 and are mounted for movement along a closed path or pattern by a drive mechanism 17. Drive mechanism 17 is shown to include first and second cantilevered transport arms 18a and 18b which have thickened portions slidably supported on a pair of parallel rods 19 for movements of arms 18a and 18b toward and away from each other in a first direction indicated by arrows 20. Cantilevered transport arms 18a and 18b have free end portions extending away from support rods 19 in the direction over supporter 13 and have nozzles 16a and 16b respectively attached to such free end portions, as hereinafter described in detail. Rods 19 are fixed, at their ends, to mounting brackets 21 secured on a movable transport table 22. A numerical control (NC) motor 23 for moving nozzles 16a and 16b in the direction of the arrows 20 is mounted on a bracket 24 secured to table 22 at one side of the latter. The shaft of motor 23 is rotataby coupled to a drive screw 25 which is journaled in bearings carried by mounting bracket 24 and a similar bracket 26 at the opposite side of table 22. Drive screw 25 includes oppositely threaded portions 25a and 25b which extend through, and are engaged with correspondingly threaded holes in thickened portions of transport arms 18a and 18b, respectively. It will be appreciated that, in response to the operation of motor 23 in one direction or the other, the transport arms 18a and 18b, and hence the nozzles 16a and 16b, respectively, attached thereto, are moved in opposed directions toward and away from each other.

Another NC motor 27 for moving nozzles 16a and 16b jointly in a direction orthogonally related to the axes of rods 19, that is, in the direction of arrow 28 at right angles to the arrows 20 on FIG. 1, is mounted on a supporting bracket 29 on bench 12. A threaded shaft 30 of NC motor 27 extends rotatably from the latter and is journaled, at its remote end, in a bearing support member 31 on bench 12. Threaded shaft 30 extends through, and engages with a similarly threaded hole in a block (not shown) fixed to the underside of transport table 22 which is slidably supported on a pair of rods 32 extending parallel to the direction of arrow 28 between mounting brackets 33 secured on bench 12. It will be appreciated that, by suitably controlling the operations of NC motors 23 and 27, nozzles 16a and 16b can be made to travel in a path corresponding to the closed pattern of sealing surface 15 starting from an initial position or point 34a which is substantially at the center of one of the longer sides of sealing surface 15 and ending at a terminal point or position 34b substantially at the center of the other relatively long side of sealing surface 15. During such movements of nozzles 16a and 16b it is intended that frit slurry will be discharged therefrom to form a stripe of the frit slurry coating sealing surface 15.

Referring now to FIG. 2, it will be seen that the source of the supply of frit slurry for the nozzles 16b and 16b may be similar to that disclosed in U.S. patent application Ser. No. 06/458,637, filed Jan. 17, 1983, now U.S. Pat. No. 4,482,579, and having a common assignee herewith. More particularly, a supply 35 of frit slurry or other viscous material is contained in a vessel or container 36 having an outlet 37 at its lower end and being provided with a stirrer 38. The frit slurry 35 is forced through outlet 37 by a gas under pressure supplied to the space 39 in vessel 36 above frit slurry supply 35, and desirably being saturated with a vaporized solvent for the frit slurry. The gas under pressure applied to space 39 may be air pressurized, for example, to 25 to 30 pounds per square inch and being supplied from a pressurized air tank 40. The air may be fed from tank 40 and bubbled through a fluid supply in a container 41 so as to saturate the air under pressure with the fluid in container 41, which fluid is desirably a solvent for the frit slurry, prior to the application of the pressurized air to space 39.

Communicating with outlet 37 of vessel or container 36 is a valve 42 which, for example, is operated by a pressurized air or pneumatic control cylinder 43. Valve 42 regulates the flow of frit slurry through outlet 37, for example, by blocking or clearing a valve passageway 42a by means of a piston-like valve element 42b. When valve 42 is opened, as shown on FIG. 2, frit slurry travels from outlet 37 through passageway 42a into flexible hoses 44a and 44b which are associated with nozzles 16a and 16b, respectively, for supplying the frit slurry to the nozzles. Due to the pressurized, saturated air in space 39 above the supply 35 of frit slurry in container 36, frit slurry is discharged from nozzles 16a and 16b when valve 42 is opened, at which time nozzles 16a and 16b are moved away from their confronting, mutually blocking relationship at the initial position 34a. The discharge of frit slurry through nozzles 16a and 16b is intended to be discontinued by closing valve 42, that is, by moving piston-like element 42b upwardly to block passageway 42a. If hoses 44a and 44b are connected directly to nozzles 16a and 16b, respectively, for example, as in U.S. patent application Ser. No. 06/458,637, now U.S. Pat. No. 4,482,579, identified more fully above, the commencement and termination of the discharge of frit slurry from nozzles 16a and 16b do not correspond precisely to the opening and closing, respectively, of valve 42. More specifically, and assuming that flexible hoses 44a and 44b and nozzles 16a and 16b are filled with frit slurry, upon the opening of valve 42, the frictional resistance to the flow of the viscous frit slurry through hoses 44a and 44b will impede the commencement of the discharge of the frit slurry from the nozzle outlets, and the pressure acting at outlet 37 of the vessel or container 36 will cause distending of flexible hoses 44a and 44b due to the inherent elasticity or resilience of the latter. Thus, even if valve 42 is opened abruptly at the commencement of the movement of nozzles 16a and 16b away from the condition of mutually abutting and blocking relation at the initial position 34a, the rate of discharge from each nozzle outlet will increase only relatively slowly so as to provide an inadequate deposit of the frit slurry at the initial position 34a on sealing surface 15. On the other hand, when valve 42 is closed, for example, as nozzles 16a and 16b near the terminal position 34b, the discharge of frit slurry from nozzles 16a and 16b will not be abruptly terminated even though valve 42 is quickly closed. More specifically, after closing of valve 42, the frit slurry in flexible hoses 44a and 44b will continue to be under pressure due to the previously described distending of the flexible hoses. In other words, after valve 42 is actually closed, hoses 44a and 44b elasticly return to their original cross-sections with the result that frit slurry is squeezed from hoses 44a and 44b to cause a continuing discharge from nozzles 16a and 16b. Such continuing discharge from the nozzles can result in an undesirable increased thickness of the frit slurry desposited on sealing surface 15 at the terminal position 34b, for example, as indicated by the shaded areas 45 on FIG. 7.

The foregoing problems are avoided in the apparatus 10 embodying the present invention by providing bellows 46a and 46b through which flexible hoses 44a and 44b are connected to nozzles 16a and 16b, respectively, and by contracting and expanding the bellows 46a and 46b in correspondence with the opening and closing, respectively, of the valve 42 at the outlet 37 of pressurized container 36. More particularly, the bellows 46a and 46b are initially in the expanded condition shown on FIG. 5 and in which, for example, the length $L_1$ of each bellows may be 1.5 inches while its diameter is 0.5 inches. Upon the opening of valve 42, each bellows 46a and 46b is contracted longitudinally to the reduced length $L_2$ on FIG. 6 at a relatively slow rate, for example, over a period of 5 seconds. Such relatively slow contraction of each bellows 46a, 46b ensures that the initial discharge of frit slurry from the respective nozzle 16a, 16b will occur without delay, notwithstanding the fact that the frictional resistance to flow of the frit slurry causes distending of the respective flexible hose 44a or 44b. In other words, the relatively slow contraction of each bellows 46a, 46b compensates for the distending of the flexible hose 44a, 44b upon the opening of valve 42. On the other hand, upon the closing of valve 42, each of bellows 46a, 46b is preferably expanded rapidly, for example, over a period of 0.5 seconds, from the contracted condition of FIG. 6 back to the extended condition of FIG. 5 so as to quickly stop the discharge of frit slurry from the respective nozzle 16a,16b. In other words, upon the closing of valve 42, the expanding of each bellow 46a,46b compensates for the pressure that continues to be exerted on the frit slurry due to the previously distended condition of the respective flexible hose 44a,44b.

Figure 3:
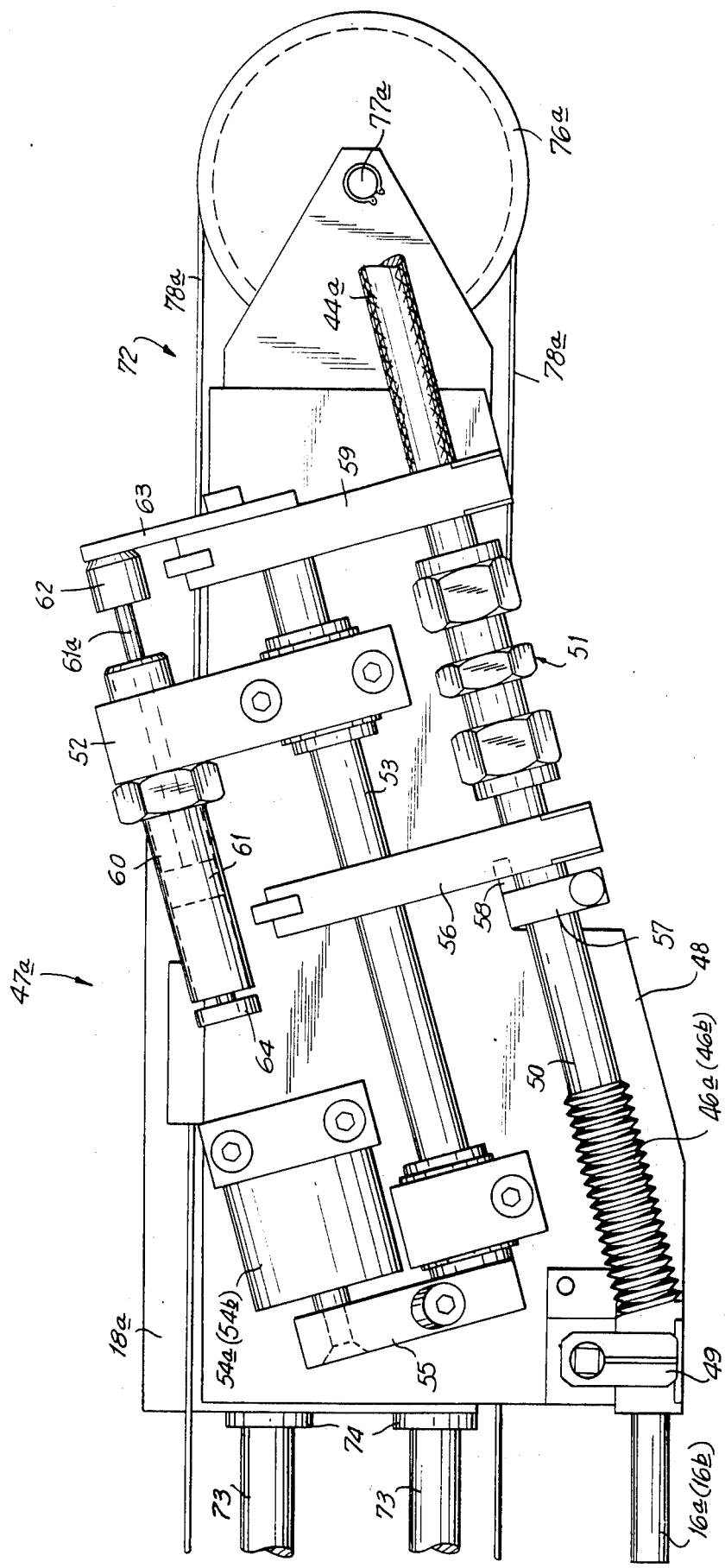
FIG. 3 is a detailed elevational view of a bellows and bellows actuating assembly associated with one of the nozzles included in the apparatus of FIG. 1

In order to effect such contracting and expanding of the bellows 46a and 46b, apparatus 10 further comprises bellows mounting and actuating assemblies 47a and 47b. As shown on FIG. 3 in respect to the assembly 47a, each of the bellows mounting and actuating assemblies 47a and 47b includes a laterally elongated vertically disposed support plate 48 suitably secured to the free end of the respective transport arm 18a or 18b. The respective nozzle 16a or 16b is mounted at a lower corner of support plate 48 adjacent the inner end of the latter by means of a nozzle mounting bracket 49 to which one end of the respective bellows 46a or 46b is also secured with its longitudinal axis being inclined upwardly from the horizontal axis of the respective nozzle. A rigid tube 50 extends from the end of bellows 46a or 46b remote from the respective nozzle and is joined by a suitable connector or coupling 51 to the respective flexible hose 44a or 44b. A bearing bracket 52 is secured on support plate 48 and contains a bearing in which a rod 53 is longitudinally slidable with the axis of such rod being parallel to the longitudinal axis of the bellows 46a or 46b and the respective rigid tube 50. An air cylinder 54a or 54b for actuating the bellows 46a or 46b, respectively, is secured to the support plate 48 of the respective assembly 47a or 47b and has its piston rod coupled through a connecting arm 55 with one end of rod 53 for causing reciprocating movement of the latter in the longitudinal direction. A bellows actuating arm 56 is clamped on rod 53 and on rigid tube 50 so that the longitudinal movements of rod 53 by air cylinder 54a or 54b are transmitted to the respective rigid tube 50 for expanding or contracting the respective bellows 46a or 46b. An anti-rotation clamp 57 is also secured on rigid tube 50 and has a pin 58 extending therefrom to engage in a corresponding socket in actuating arm 56 so that twisting of the bellows 46a or 46b is avoided during its expansion and contraction. A hose holder 59 is also clamped on rod 53 and is engaged with the flexible hose 44a or 44b at the end of the latter adjacent coupling 51. A damper or shock absorber 60 is mounted on bearing bracket 52 with its axis parallel to rod 53 and contains a longitudinally slidable damping piston 61 from which a piston rod 61a extends out of shock absorber 60 to a head 62. An abutment projection 63 extends from hose holder 59 for movement with rod 53 and is engageable against head 62 in response to the longitudinal movement of rod 53 by air cylinder 54a or 54b in the direction for contracting the respective bellows 46a or 46b. Thus, the shock absorber or damper 60 will slow the rate of movement of rod 53 in the direction for contracting the respective bellows. An adjusting knob 64 is provided on shock absorber 60 for regulating or varying the rate at which air can escape in response to the movement of piston 61 by the action of abutment 63 against head 62. It will be appreciated that, when air cylinder 54a or 54b is operated in the direction for moving rod 53 toward the right, as viewed on FIG. 3, that is, in the direction for expanding bellows 46a or 46b, abutment 63 merely moves away from head 62 so that shock absorber or damper 60 does not slow or interfere with the rapid expansion of the bellows. A spring (not shown) may be provided in shock absorber 60 for urging piston 61 in the direction maintaining contact of head 62 with abutment 63.

Figure 8:
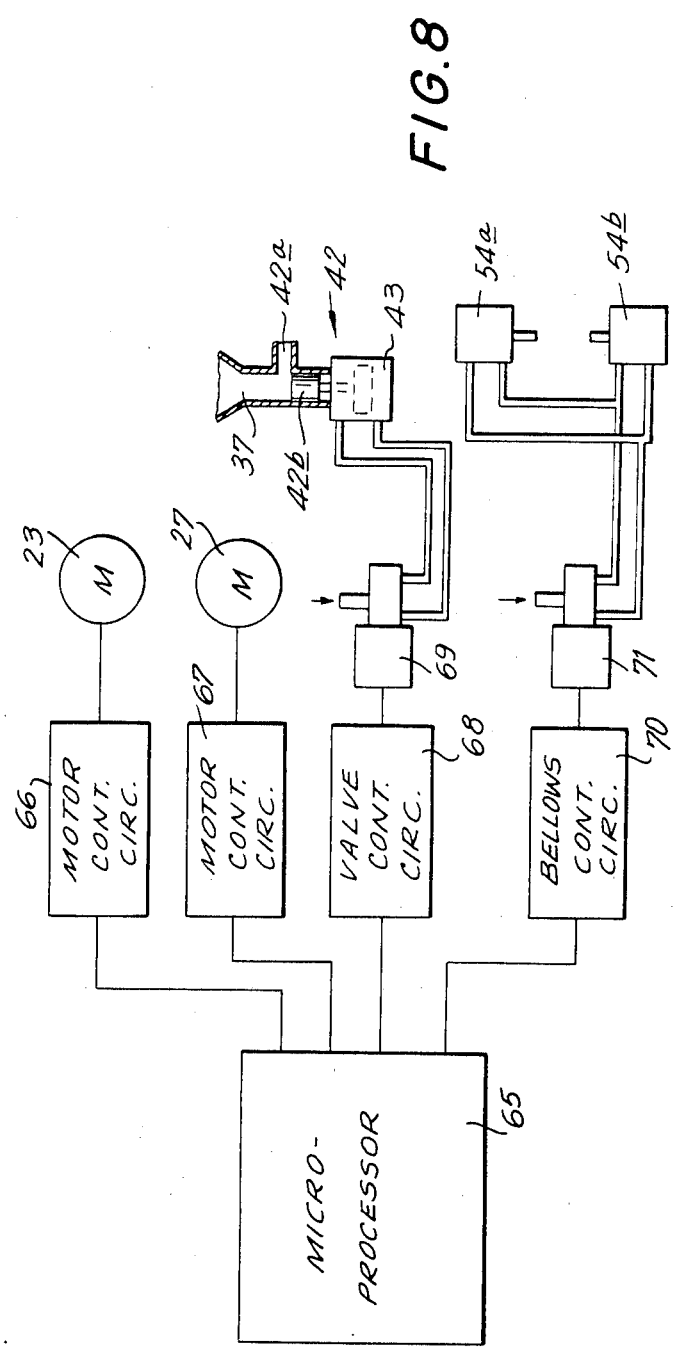
FIG. 8 is a schematic view of a control system for the apparatus embodying the invention.

Referring now to FIG. 8, it will be seen that apparatus 10 according to this invention may desirably include a microprocessor 65 for controlling the various operations thereof. More particularly, microprocessor 65 is shown to control motor control circuits 66 and 67 for motors 23 and 27, respectively, so as to obtain the desired movements of nozzles 16a and 16b. Microprocessor 65 further controls a valve control circuit 68 which, in turn, controls the energizing of a solenoid operated valve 69 by which air under pressure is selectively supplied to one end or the other of pneumatic control cylinder 43 for opening and closing, respectively, the main valve or shutter 42 in suitably timed relation to the movements of the nozzles, as will be described in detail. Finally, microprocessor 65 is shown to control a bellows control circuit 70 which controls the energizing of a solenoid-operated valve 71 by which the supplying of air under pressure to cylinders 54a and 54b is controlled for expanding and contracting the bellows 46a and 46b in timed relation to the movements of the nozzles.

It is desirable that nozzles 16a and 16b of apparatus 10 be precisely aligned and pressed against each other when disposed at each of the initial and terminal positions 34a and 34b. During movements of nozzles 16a and 16b in opposite directions toward and away from each other by the operation of motor 23, it is desirable that any play between the threaded portions of 25a and 25b of drive screw 25 and the threaded holes in transport arms 18a and 18b should be taken up or eliminated for ensuring that nozzles 16a and 16b will undergo precisely corresponding movements.

Figure 4:
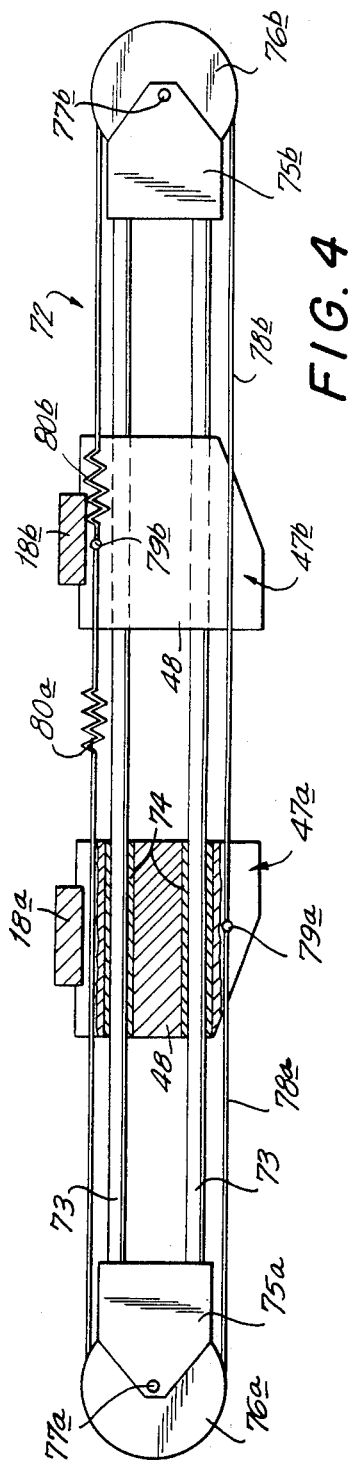
FIG. 4 is an elevational view, partly broken away and in section, of a nozzle guiding assembly included in the apparatus of FIG. 1, but as viewed from the side opposite to that appearing on FIG. 1.

In order to achieve the foregoing desirable characteristics of the movements of nozzles 16a and 16b, apparatus 10 according to this invention is shown to further comprise a nozzle guiding assembly 72 (FIGS. 1,3 and 4) which includes a pair of vertically spaced, horizontal guide rods 73 extending parallel to the direction of movement of nozzle 16a and 16b relative to each other through slide bearings 74 carried by support plates 48 of bellows mounting and actuating assemblies 47a and 47b (FIG. 4) . The adjacent ends of guide rods 73 at the opposite ends of the latter are rigidly secured together by pulley supports 75a and 75b, and pulleys 76a and 76b are rotatable on axles 77a and 77b carried by supports 75a and 75b, respectively. A first cable 78a runs around pulley 76a and is connected, at one end, to an anchor 78a projecting rearwardly from support plate 48 of assembly 47a, while the opposite end of cable 78a is connected by way of a tension spring 80a to an anchor 79b projecting rearwardly from the support plate 48 of assembly 47b. A second cable 78b runs around pulley 76b and is connected, at one end, to anchor 79a, while the opposite end of cable 78b is connected through a tension spring 80b with anchor 79b.

The cables 78a and 78b and springs 80a and 80b connected as described above ensure that, as support arms 18a and 18b move relative to each other in the direction of the arrows 20 on FIG. 1, the centers of the guide rods 73 remain centered between the support plates 48 carrying nozzles 16a and 16b. Thus, guide rods 73 cooperate with slide bearings 74 to ensure that, when nozzles 16a and 16b are brought together at the initial and terminal positions 34a and 34b, the outlets of the nozzles are precisely aligned with each other. Furthermore, cables 78a and 78b and springs 80a and 80b exert forces on support arms 18a and 18b for taking up any play that may exist between the threaded portions 25a and 25b of drive screw 25 and the threaded bores of support arms 18a and 18b, respectively. Thus, nozzles 16a and 16b are synchronously moved relative to each other in response to operation of motor 23 and the final movements of nozzles 16a and 16b toward each other into abuttingly opposed and mutually blocking relation at positions 34a and 34b are effected against the yieldable resistance of springs 80a and 80b so as to avoid any damage to the nozzles.

The above described apparatus 10 operates as follows:

Drive mechanism 17 and nozzles 16a and 16b are initially positioned as shown on FIG. 1 to dispose nozzles 16a and 16b in confronting, mutually blocking relationship in initial position 34a which is substantially at the center of one longer side of sealing surface 15. Further, bellows 46a and 46b are initially fully extended, that is, each have the length $L_1$, as shown on FIG. 9A. It is also assumed that flexible hoses 44a and 44b and bellows 46a and 46b, as well as the respective nozzles 16a and 16b, are filled with frit slurry at the start of a coating operation. In response to a suitably generated start signal, microprocessor 65 causes motor control circuit 66 to operate motor 23 in the normal direction with rapid acceleration up to a normal speed $S_1$, as indicated at $S_a$ on FIG. 9B. Such operation of motor 23 in the normal direction, and the consequent rotation of drive shaft 25, causes movements of transport arms 18a and 18b in opposite directions away from each other for similarly moving nozzles 16a and 16b away from initial position 34a at the speed $S_1$ along the respective relatively long side of sealing surface 15. Coincidentally with the commencement of such operation of motor 23, microprocessor 65 causes circuits 68 and 70 to energize solenoid-operated valves 69 and 71, respectively, so that valve 42 is practically instantaneously opened (FIG. 9C) and air under pressure is supplied to cylinders 54a and 54b in the directions for causing contraction of bellows 46a and 46b, respectively. However, the contracting movements of bellows 46a and 46b are slowed by the resistances offered by shock absorbers or dampers 60 so that, for example, the contractions of bellows 46a and 46b occur over the initial 5 seconds of the coating operation (FIG. 9A).

Thus, as nozzles 16a and 16b are moved away from each other, the opening of valve 42 permits the pressure of air on the frit slurry supply 35 in vessel 36 to act on the frit slurry in hoses 44a and 44b for initiating the discharge of the frit slurry from the nozzle outlets, and the gradual contraction of bellows 46a and 46b compensates for the initial large frictional resistance to such discharge for ensuring that, as nozzles 16a and 16b move in opposite directions away from the initial position 34a, there are instantaneous discharges from the nozzle outlets and a substantially uniform stripe of the frit slurry is deposited on surface 15.

When nozzles 16a and 16b approach corners 15a and 15b, respectively, of sealing surface 15 (FIG. 1), microprocessor 65 directs motor control circuit 67 to cause operation of motor 27 in the normal direction and to correspondingly rotate threaded drive shaft 30 for moving table 22 in the direction toward supported funnel-shaped portion 11, while motor 23 continues to operate for moving transport arms 18a and 18b in the direction away from each other. By reason of the composite movements of transport arms 18a and 18b and transport table 22, nozzles 16a and 16b turn corners 15a and 15b, respectively, of sealing surface 15 while continuing to discharge a stripe of frit slurry thereon. When nozzles 16a and 16b have finished turning corners 15a and 15b, NC motor 23 is stopped by circuit 66 under the control of microprocessor 65, and motor 27 continues to operate so that nozzles 16a and 16b are then moved along the respective relatively short sides of sealing surface 15 while continuing to discharge frit slurry thereon.

As nozzles 16a and 16b approach corners 15c and 15d, respectively, of sealing surface 15, microprocessor 65 causes motor control circuit 66 to operate motor 23 in the reverse direction, that is, in the direction for causing drive shaft 25 to move transport arms 18a and 18b in the direction toward each other, while motor 27 continues to operate in the direction for moving table 22 toward the supported funnel-shaped portion 11. As a result of such composite movements of transport arms 18a and 18b and table 22, nozzles 16a and 16b turn corners 15c and 15d of sealing surface 15 while continuing to discharge frit slurry thereon. When nozzles 16a and 16b have finished turning corners 15c and 15d, respectively, microprocessor 65 causes motor control circuit 67 to halt the operation of motor 27 while motor 23 continues to operate in the reverse direction so that nozzles 16a and 16b are transported toward each other along the other relatively long side of sealing surface 15 while continuing to discharge frit slurry thereon.

As nozzles 16a and 16b approach the terminal position 34b, microprocessor 65 signals valve control circuit 68 to cause solenoid controlled valve 69 to apply air under pressure to cylinder 43 in the direction for closing main valve 42. Typically, such operation of solenoid controlled valve 69 may occur at the time t₂ (FIG. 9C) approximately 2 seconds before nozzles 16a and 16b reach the terminal position 34b. However, due to the pressure of the frit slurry in vessel 36, the movement of piston-like valve element 42b to its closed position fully blocking passageway 42a is slowed or resisted, for example, as indicated at 81 on FIG. 9C.

Further, at or about the time t₂, microprocessor 65 signals motor control circuit 66 to reduce the speed of the reverse rotation of motor 23, for example, to the reduced speed S₂ on FIG. 9B, so that the final movements of nozzles 16a and 16b toward terminal position 34b are effected at reduced speed.

Finally, in order to ensure that, as valve 42 is closed, the return of the previously distended flexible hoses 44a and 44b to their original diametrical dimensions will not cause the continued undesirable discharge of frit slurry from nozzle 16a and 16b, microprocessor 65 signals bellows control circuit 70 to cause solenoid-operated valve 71 to apply air under pressure to cylinders 54a and 54b in the directions for effecting rapid extension of bellows 46a and 46b starting at the time t₃, for example, approximately 0.5 seconds prior to the arrival of the nozzles at terminal position 34b (FIG. 9A). Thus, as shown on FIG. 7, the final flows of frit slurry from nozzles 16a and 16b form a tapered joint having a thickness approximately equal to that of the remainder of the stripe of frit slurry coating the sealing surface 15. In other words, as indicated on FIG. 9D, the rate of deposit of frit slurry on surface 15 is approximately constant throughout the coating operation. Finally, when nozzles 16a and 16b reach the terminal position 34b, microprocessor 65 signals motor control circuit 66 to halt the operation of motor 23 with the nozzles 16a and 16b in abutting, mutually blocking relationship under the urging of springs 80a and 80b.

Although the present invention has been described with reference to the applying of a frit slurry to a sealing surface of a cathode ray tube, it is to be noted that the invention can also be applied to the supplying of frit slurry or other viscous materials to other surfaces.

Further, although an illustrative embodiment of the invention has been described in detail herein with reference to the accompanying drawings, it is to be noted that the invention is not limited to that precise embodiment, and that various changes and modifications may be effected therein by one skilled in the art without departing from the scope or spirit of the invention as defined in the appended claims.

What is claimed is:

1. Apparatus for applying a viscous material to a surface of an article comprising:
a source of supply of said viscous material under pressure having an outlet,
hose means extending from said outlet,
nozzle means,
bellows means connecting said hose means with said nozzle means and continuously communicating with the latter for supplying said viscous material under pressure from said source through said hose means and said bellows means so as to be discharged at said nozzle means, said bellows means being expansible and contractible for influencing the discharge of the viscous material from said nozzle means,
valve means at said outlet of the source for controlling the flow of the viscous material from said source to said hose means,
valve control means for opening and closing said valve means, and
means for contracting and expanding said bellows means in correspondence with the opening and closing, respectively, of said valve means.

2. Apparatus as in claim 1; in which said means for contracting and expanding said bellows means includes means for effecting said contracting and expanding at different rates.

3. Apparatus as in claim 1; in which said means for contracting and expanding said bellows means includes means for slowing the rate of contraction of said bellows means relative to the rate of expansion thereof.

4. Apparatus as in claim 1, further comprising drive means for moving said nozzle means along said surface and thereby determining a pattern of application of the viscous material thereto, and wherein operations of said drive means and of said valve control means and said means for contracting and expanding are coordinated so that said valve means is opened at the commencement of the movement of said nozzle means and closed at the termination of said movement, and said bellows means is contracted and expanded in correspondence with the opening and closing, respectively, of said valve means.

5. Apparatus as in claim 4; in which said means for contracting and expanding said bellows means includes means for providing a relatively slow rate of contraction and a relatively high rate of expansion.

6. Apparatus as in claim 4; in which said surface of the article is substantially horizontal and upwardly facing, said pattern is closed, said nozzle means includes first and second nozzles arranged horizontally above said surface and having first and second nozzle outlets, respectively, said bellows means includes first and second bellows connected between said hose means and said first and second nozzles, respectively, and said drive means are operative to move said first and second nozzles in opposite directions along said closed pattern from a first position at which said first and second nozzle outlets are abuttingly opposed and mutually blocking to a second position at which said first and second nozzle outlets are again abuttingly opposed and mutually blocking.

7. Apparatus as in claim 6; in which said drive means reduces the speed of movement of said nozzles in two steps as said nozzles near said second position.

8. Apparatus as in claim 7; in which said closing of the valve means occurs during the reduction of the speed of movement of said nozzles.

9. Apparatus as in claim 10; in which said means for contracting and expanding the first and second bellows include means for providing a relatively slow rate of contraction starting with the movement of said first and second nozzles from said first position, and a relatively high rate of expansion of said bellows during the last of said steps in the reduction of the speed of movement of said nozzles.

10. Apparatus as in claim 8; in which said means for contracting and expanding the first and second bellows include fluid pressure operated cylinders having reciprocably movable piston rods, means connecting said piston rods with said bellows for contracting and expanding the latter in response to movements of said piston rods in opposite directions, respectively, and shock absorbing means clamping movements of said piston rods and respective bellows only in the direction corresponding to contraction of said bellows.

11. Apparatus as in claim 6; further comprising a frame having support means thereon for fixedly positioning the article to which the viscous material is to be applied, first and second cantilevered transport arms having end portions extending over said support means and carrying said first and second nozzles, respectively, means mounting said transport arms for movements toward and away from each other in a first direction and for joint movements in a second direction orthogonally related to said first direction, and nozzle guiding means associated with said end portions of the transport arms for ensuring that said first and second nozzle outlets precisely come together at said first and second positions on the closed pattern.

12. Apparatus as in claim 11; in which said means mounting the transport arms includes a transport table having said transport arms mounted thereon for movement relative to each other and relative to said table in said first direction, and means mounting said transport table for movement relative to said frame in said second direction; and said drive means includes a first drive screw rotatable on said table and threadably engaged with said transport areas for effecting said movement toward and away from each other in said first direction, a second drive screw rotatable on said frame and threadably engaged with said table for effecting said joint movements in the second direction, and first and second reversible motors for selectively driving said first and second drive screws.

13. Apparatus as in claim 12; in which said nozzle guiding means include first and second nozzle support blocks secured to said end portions of the first and second transport arms and having said first and second nozzles, respectively, fixed thereto, guide rods extending slidably through said support blocks in said first direction, first and second pulley supports secured to the opposite ends of said guide rods, first and second pulleys rotatable on said first and second pulley supports, respectively, a first cable and tension spring assembly trained around said first pulley and connected, at its opposite ends, to said first and second nozzle support blocks, and a second cable and tension spring assembly trained around said second pulley and connected, at its opposite ends, to said second and first nozzle support blocks so that, as said support arms move relative to each other in said first direction, the centers of said guide rods remain centered between said nozzle support blocks and relative play between said first drive screw and said transport arms is taken up by said first and second cable and tension spring assemblies.

14. Apparatus as in claim 4; in which said viscous material is a frit slurry, said surface is a seal edge surface of a funnel portion of a cathode ray tube, and said pattern is closed.

* * * * *